UNITED STATES PATENT OFFICE.

PAUL KOLESCH, OF STUTTGART, GERMANY.

VEGETABLE BUTTER CAPABLE OF BEING SPREAD.

No. 910,827.   Specification of Letters Patent.   Patented Jan. 26, 1909.

Application filed August 29, 1907. Serial No. 390,682.

*To all whom it may concern:*

Be it known that I, PAUL KOLESCH, a citizen of the German Empire, residing at Stuttgart, in the German Empire, have invented a new and useful Vegetable Butter Capable of Being Spread; and I do hereby declare the following to be a full, clear, and exact description of the same.

Vegetable butter is, as is well known, made from various oils, such as cocoanut oil and palm oil, or the like, by refining the same.

The result of the processes hitherto employed is, as is well known, a tallow product, which cannot be spread. Vegetable butter has, therefore, not been a commercial success as a butter substitute, to the extent desired.

Now this invention has for its object a vegetable butter, which immaterially as to the manner in which it is made, is capable of being spead, like ordinary butter, on bread, or the like, without further difficulty.

The method or process consists of the following:—The oil having been subjected to the action of heat, is allowed to cool, and just at the critical temperature (at which it passes from the fluid to the solid condition) there is added thereto 7% to 9% of refined spirit—(96%). The two constituents are intimately united by stirring, and there results therefrom a new commercial product, namely, a permanently fixed plastic vegetable butter, that will maintain its plastic spreadable quality, independent of fluctuations of temperature and for practically an unlimited period. If desired, $\frac{1}{2}$% of ground nut-oil can be added during the stirring. It is fair to assume that by the addition of a fixed small amount of alcohol (7% to 9%) at a certain fixed temperature (the "critical"), there is formed a definite chemical compound (or mixture, at least) of the two substances, having such qualities that it will remain permanently suitable for use as an article of food.

I declare that what I claim is:—

1. The process of manufacturing a permanently plastic vegetable butter, which consists in subjecting cocoanut oil, palm oil, and the like, to the action of heat, allowing the same to cool, adding to the mixture at the temperature at which it assumes the solid state about 7% to 9% of refined alcohol, and thoroughly stirring the resulting compound.

2. The process of manufacturing a permanently plastic vegetable butter, which consists in adding, at the critical temperature, to cocoanut oil, palm oil, and the like, 7% to 9% of refined alcohol, and intimately mixing the alcohol with the fatty constituents.

3. The process of manufacturing permanently plastic vegetable butter, which consists in subjecting refined vegetable oil, at the critical temperature, to the action of refined alcohol, and intimately mixing the fatty constituents and the alcohol.

4. As a new article of manufacture, a permanently plastic vegetable butter composed of a mixture of refined vegetable oil and alcohol.

5. A permanently plastic vegetable butter composed of refined cocoanut oil to which has been added 7% to 9% of refined alcohol.

6. A soft vegetable butter capable of being readily spread and consisting of a permanent mixture of refined vegetable oil, refined spirit and ground nut oil.

In testimony whereof I affix my signature, in presence of two witnesses.

PAUL KOLESCH.

Witnesses:
 JEAN GULDEN,
 HERM. HOPPE.